(12) United States Patent
Lu et al.

(10) Patent No.: US 8,090,959 B2
(45) Date of Patent: Jan. 3, 2012

(54) METHOD AND APPARATUS FOR PROTECTING .NET PROGRAMS

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 881 days.

(21) Appl. No.: 12/124,680

(22) Filed: May 21, 2008

(65) Prior Publication Data

US 2009/0138863 A1     May 28, 2009

(30) Foreign Application Priority Data

Nov. 22, 2007 (CN) .......................... 2007 1 0177937

(51) Int. Cl.
    *G06F 21/00* (2006.01)
(52) U.S. Cl. .......................................... 713/190; 726/22
(58) Field of Classification Search .................. 713/187, 713/189, 190; 726/22; 717/100, 114–119, 717/140, 145, 146, 148, 151, 159
See application file for complete search history.

(56) References Cited

U.S. PATENT DOCUMENTS

| | | | | |
|---|---|---|---|---|
| 5,230,050 A * | 7/1993 | Iitsuka et al. | ................. | 717/145 |
| 5,530,752 A * | 6/1996 | Rubin | ............................. | 705/59 |
| 6,029,002 A * | 2/2000 | Afifi et al. | ..................... | 717/131 |
| 6,668,325 B1 * | 12/2003 | Collberg et al. | .............. | 713/194 |
| 6,779,114 B1 * | 8/2004 | Chow et al. | .................... | 713/189 |
| 7,124,445 B2 * | 10/2006 | Cronce et al. | ..................... | 726/26 |
| 7,730,530 B2 * | 6/2010 | Bodorin et al. | .................. | 726/22 |
| 7,743,423 B2 * | 6/2010 | Lange et al. | ..................... | 726/26 |
| 2008/0005160 A1 * | 1/2008 | Lakshman | ................ | 707/103 R |
| 2008/0229115 A1 * | 9/2008 | Wollnik et al. | ................ | 713/190 |
| 2010/0005527 A1 * | 1/2010 | Jeon | ................................ | 726/22 |
| 2010/0313188 A1 * | 12/2010 | Asipov et al. | ................. | 717/139 |

* cited by examiner

*Primary Examiner* — Gilberto Barron, Jr.
*Assistant Examiner* — Abdulhakim Nobahar
(74) *Attorney, Agent, or Firm* — Harness, Dickey & Pierce, P.L.C.

(57) ABSTRACT

The present invention discloses a method and apparatus for protecting .net programs, relating to software protection. The method mainly includes: selecting a binary code segment from a .net program; transforming the binary code segment, and removing it from the .net program; writing the binary code segment to a shell of the .net program, and writing a shell calling instruction to the .net program; and executing the .net program, and calling a .net virtual machine to execute the binary code segment. The apparatus includes a selecting module, a transforming and removing module, a writing module, and an executing module. The programs running on the .net platform can be protected simply by being transformed.

12 Claims, 2 Drawing Sheets

METHOD AND APPARATUS FOR PROTECTING .NET PROGRAMS

CROSS-REFERENCES TO RELATED APPLICATIONS

This application claims priority to Chinese Patent Application No. 200710177937.6, filed on Nov. 22, 2007, incorporated by reference herein for all purposes.

FIELD OF THE INVENTION

The present invention relates to software protection, and more particularly, to method and apparatus for protecting .net programs.

BACKGROUND OF THE INVENTION

As a new cross-language software development platform based on the Internet, *net was introduced by Microsoft in line with the trends of distributed computing, component oriented, enterprise-level applications, software-as-a-service and web-centered demands in the software industry. Although it is not a development language, the .net platform provides support for a number of development languages. Among others, the *net platform helps users interact with different smart devices via the web, while making sure that the interaction is controlled by users, instead of applications, which gives users a personalized and comprehensive experience by smart devices connected to XML web services. The smart devices are tools with a web function, such as a personal computer, a palm computer, and a smart phone. With software on these devices, the devices are capable of interacting with users, networks, information and other devices or services more smartly.

The compilation of a .net language includes two phases. Firstly, an advanced language is compiled into an intermediate language (namely, intermediate code) called IL, which is more similar to a machine language than the advanced language. However, the intermediate language contains some abstract concepts (e.g. classes, and exceptions). When compiling the advanced language for the first time, a compiler will save the compiled intermediate language to a .dll or .exe file before creating a stub function for each of methods of a class. The stub function calls a just-in-time (JIT) compiler and passes its address as an argument to the just-in-time compiler. The just-in-time compiler then obtains the intermediate language from the .dll or .exe file, compiles the intermediate language into a machine language, and replaces a temporary calling function with a machine language in memory. The stub function then calls the compiler and compiles itself into a native machine language. For example, the JIT compiler is a typical just-in-time compiler. The JIT compiler compiles a code segment before execution of the code segment. The compilation result is a native static machine code, e.g. a machine code of an x86 instruction program under runtime environment.

A so-called Virtual Machine (VM) can be imaged as a "machine" simulated by software, which has a processor, a memory, a register etc. for simulating execution of all instructions. There are no specific requirements for runtime environment for software executed on the "machine". The VM is transparent to programs executed thereon. For example, an x86 VM simulates runtime environment of an x86 instruction program, while a c51 VM simulates runtime environment of a c51 instruction program.

A compilation process refers to a process of translating a source program written with an advanced language into an equivalent low-level language (assembly language or machine language) target program. A decompilation process can be deemed as a reverse process of the compilation process, that is, a process of translating a target code of machine language into an equivalent code of assembly language or advanced language. An instruction transformation refers to a process of transforming a target instruction on a platform into a target instruction on a different platform according to execution logic of a program.

The .net architecture provides an outstanding convenience at the cost of bringing a sensitive defect that a .net program set can be easily decompiled. There are many .net intermediate code solutions to this defect in the prior art, although they are not very effective indeed. These solutions only reduce readability of the decompiled code without achieving an essential effect of anti-decompilation. An obfuscated source code can still be easily decompiled by attackers with malicious intent. Although developers can employ strong encryption algorithms, the code can be obtained because it will be decrypted for execution in a computer memory at runtime.

Currently, a pure software protection method for .net programs includes the steps of:
1) decompiling a .net program to an IL text file;
2) modifying the IL text file, by adding a decryption function external to contents that need to be protected;
3) compiling the modified IL text file to generate a binary instruction file that can be executed on the .net platform;
4) encrypting segments that need to be protected in the binary instruction file using software; and
5) decrypting the encrypted binary instructions at runtime with the decryption function previously added, thus protecting the .net program.

The entire process is accomplished within a computer.

Generally, a shell is added to an executable file to implement protection. Users actually execute the shell, which will uncompress the protected program in the memory, and transfer control power to the uncompressed real program. All the above processes are performed in the memory, so that users do not know (and do not need to know) the processes, which will not affect execution rate. If a verification device for a software dongle or key disk is also added to the shell, a shell encryption is formed. The shell will or will not compress the program at all. Advantages of the shell involve anti-tracing, encrypting code and data, and protecting integrity of program data, which ensure that the program code is not modified or traced and debugged by hackers or others with malicious intent.

In prior art, a hardware device is often applied to protect a .net program. In other words, one or more parts of the .net program are extracted from the .net program to an encryption apparatus to run thereon, while the remaining program runs on a computer, so as to protect the .net program. An advanced encryption apparatus is programmable, and is used to protect a program by storing a key code of the program to be protected in an encryption apparatus and implementing communication between the program to be protected on the computer and an information security device. Therefore, shell calling instructions need to be written. The protected program performs communications with the encryption apparatus by calling an Application Programming Interface (API), which is an interfacing convention among different components of a system and a programming interface for exchanging information and commands between applications and a hardware system. A specific VM may be developed in the advanced encryption apparatus by developers, so as to execute a code in a format conforming to the VM directly in the encryption apparatus.

However, the hardware protection method has disadvantages of small protection scope, low protection strength and controllability, and restricted program code executed each time, thus a lot of work is required in this method. In another regard, the pure software protection method for .net programs in the prior art is easy to be cracked because the protected .net program still runs in the memory, which brings risks to the .net program.

SUMMARY OF THE INVENTION

To overcome the problems of the prior art, the present invention provides a method for protecting .net programs. The method includes the steps of:
- A. selecting a binary code segment containing .net intermediate language instructions from a compiled .net program;
- B. transforming the binary code segment, and removing the binary code segment from the .net program;
- C. writing the transformed binary code segment to a shell of the .net program, and writing a shell calling instruction to the .net program; and
- D. executing the .net program, calling a .net virtual machine by the shell calling instruction upon running to the shell calling instruction, and executing the binary code segment that has been transformed by the .net virtual machine.

The step A of the method may include: automatically or manually selecting a binary code segment according to its importance from a compiled .net program, containing .net intermediate language instructions.

The transforming the binary code segment at the step B may include: logically transforming the binary code segment, and encrypting or compressing the binary code segment that has been logically transformed.

The transforming the binary code segment at the step B may include: logically transforming the binary code segment, or encrypting or compressing the binary code segment.

The logically transforming the binary code segment includes: exchanging instructions, disordering instructions, or recoding.

The writing a shell calling instruction to the .net program at the step C may include: writing a shell calling instruction to an original location of the binary code segment in the .net program.

The step D may include the substeps of:
- D1. executing the .net program, and calling the shell by the shell calling instruction upon executing the shell calling instruction;
- D2. calling a .net virtual machine by the shell;
- D3. executing the transformed binary code segment through a parsing instruction corresponding to the transforming by the .net virtual machine according to a previous convention; and
- D4. outputting a correct execution result by the .net virtual machine.

The substep D3 may include:
- D3-1. compiling the binary code segment to a native code instantly by the .net virtual machine according to a previous convention; and
- D3-2. executing the native code through a parsing instruction corresponding to the transforming by the .net virtual machine.

The transforming is based on a previous convention with the .net virtual machine in the shell of the .net program, and is directed to a source code on the basis of its original instruction format.

The shell calling instruction is adapted to call the shell, and the .net virtual machine is automatically called upon the shell is loaded and executed.

In another aspect, the present invention provides an apparatus for protecting .net programs. The apparatus includes:
- a selecting module, adapted for selecting a binary code segment containing .net intermediate language instructions from a compiled .net program, and transmitting the binary code segment;
- a transforming and removing module, adapted for receiving the binary code segment transmitted from the selecting module, transforming the binary code segment, removing the binary code segment from the .net program, and transmitting the transformed binary code segment;
- a writing module, adapted for receiving the transformed binary code segment transmitted from the transforming and removing module, writing the binary code segment to a shell of the .net program, and writing a shell calling instruction to the .net program; and
- an executing module, adapted for executing the transformed binary code segment upon running to the shell calling instruction of the .net program.

The executing module includes:
- a .net virtual machine calling unit, adapted for calling a .net virtual machine upon running to the shell calling instruction of the .net program; and
- a virtual machine unit, adapted for executing the transformed binary code segment through a parsing instruction corresponding to the transforming according to a previous convention with the .net virtual machine.

Alternatively, the executing module includes:
- a .net virtual machine calling unit, adapted for calling a .net virtual machine upon running to the shell calling instruction of the .net program;
- a just-in-time compiling unit, adapted for compiling the transformed binary code segment to a native code in time, and transmitting the native code, according to a previous convention with the .net virtual machine; and
- a virtual machine unit, adapted for receiving the native code transmitted from the just-in-time compiling unit, and executing the native code through a parsing code corresponding to the transforming, according to a previous convention with the .net virtual machine.

By transforming the binary code segment of a .net program and executing the transformed binary code segment through a .net virtual machine, effective protection for the .net program is achieved with the present invention, without any restrictions. Only by a simple transformation, a program running on the .net platform is protected. In addition, the transformation is processed in a predetermined way, and is controlled by a fixed or changeable rule. Thereby, the decompiled code is disordered. The security strength of software protection can be improved. Even though someone with malicious intent can fetch the transformed source code by detecting the memory, the program cannot be executed properly without awareness of the rule of transformation. Therefore, it is more difficult to crack the source code.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments and the drawings below.

The present invention provides a method for protecting .net programs using pure software. The method mainly includes the following steps of: selecting a binary code segment containing .net intermediate language instructions from a compiled .net program; transforming the binary code segment, and removing the binary code segment from the .net program; writing the transformed binary code segment to a shell of the .net program, and writing a shell calling instruction to the .net program; and executing the .net program, calling a .net virtual machine by the shell calling instruction upon executing the shell calling instruction, and executing the transformed binary code segment by the .net virtual machine.

In an embodiment of the present invention, the transformation of the binary code segment is based on a previous convention with the .net virtual machine in the shell of the .net program, and is directed to a source code in original instruction format. An implementation of the transformation may include logically transforming the binary code segment, or encrypting or compressing the binary code segment, or by logically transforming the binary code segment, and then encrypting or compressing the binary code segment that has been logically transformed. The logically transforming may include exchanging instructions, disordering instructions, recoding etc. The following is a detailed description of an embodiment of the present invention, with regard to a transformation of the binary code segment by exchanging instructions.

Embodiment 1

Figure 1:
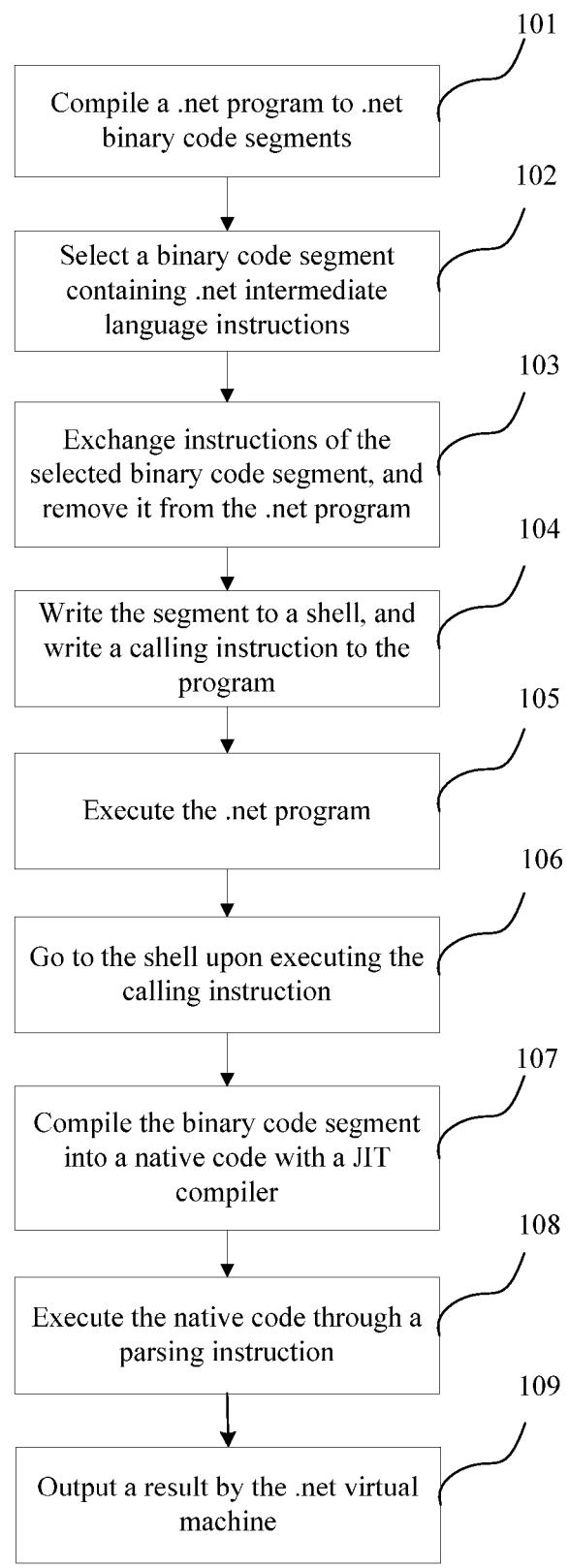
FIG. 1 is a flow diagram of a method for protecting .net programs of the present invention.

Referring to FIG. 1, the present invention provides a method for protecting .net programs, which includes the following steps.

Step 101. compiling a .net program to be protected to .net binary code segments.

A .net program is provided below for the purpose of description:

```
Class test
{
Int Add(int a,int b)
{
Return a+b;
}
Static int main(String args[ ])
{
    Add(1,3);
}
}
```

An executable file is loaded and authenticated, and metadata tables are obtained as follows:

```
//Begin loading a PE file
  if(VM_READFILE(0,sizeof(g_Dosx.e_magic),
(char *)&g_Dosx.e_magic) == -1 )
    return 0;
```

```
  if(VM_READFILE(0x3C,sizeof(g_Dosx.e_lfanew),
(char *)&g_Dosx.e_lfanew) == -1)
    return 0;
  if(g_Dosx.e_magic!=0x5a4d)
    return 0;
  //File Header Offset
  m_Off=g_Dosx.e_lfanew+4;
  if( VM_READFILE(m_Off,sizeof(g_Filex.Machine)+
sizeof(g_Filex.NumberOfSections),(char*)&g_Filex.Machine) == -1 )
    return 0;
  //Option Header Offset
  m_Off+=sizeof(IMAGE_FILE_HEADER);
  m_Off+=0x60;
  m_Off+=(IMAGE_DIRECTORY_ENTRY_COM_DESCRIPTOR  *
sizeof(IMAGE_DATA_DIRECTORY_X));
  //Get Com_Directory
  if( VM_READFILE(m_Off,sizeof(g_ComDirx),
(char *)&g_ComDirx) == -1 )
    return 0;
  //Get Section_Header Offset
  g_SectionOff=g_Dosx.e_lfanew+4+sizeof(IMAGE_FILE_HEADER)+
sizeof(IMAGE_OPTIONAL_HEADER);
  //Get _Cor20
  m_Off=Rva2Raw_x(g_ComDirx.VirtualAddress);
  if( VM_READFILE(m_Off,sizeof(g_Cor20x),
(char *)&g_Cor20x) == -1 )
    return 0;
  //Get PE_EXTEND offset
  g_PeExtendOff=Rva2Raw_x(g_Cor20x.MetaData.VirtualAddress);
  //Get Pe_Extend
  GetPeExtendHeader_x( );
  //Get Meta_Header
  GetMetaHeader_x( );
  //Get number and size of metadata tables
  m_Index=0;
  while (m_Index <= 43)
  {
    g_RowOfTables[m_Index]=GetRowsOfTables_x(m_Index);
    m_Index++;
  }
  m_Index=0;
  while (m_Index <= 43)
  {
    g_SizeOfTables[m_Index]=GetSizeOfTables_x(m_Index);
    m_Index++;
  }
```

The above .net program is compiled into a .net binary code segment with a machine assembly language.

Step 102. selecting a binary code segment containing .net intermediate language instructions from the compiled .net program.

The .net intermediate language instructions include the IL instructions. For the purpose of description, the IL instructions are used in this embodiment. A selected binary code segment in the format of the IL assembly language is illustrated below for convenience:

```
locals init ([0] int32 CS$1$0000)
    IL_0000:  nop
    IL_0001:  ldarg.1
    IL_0002:  ldarg.2
    IL_0003:  add
    IL_0004:  stloc.0
    IL_0005:  br.s         IL_0007
    IL_0007:  ldloc.0
    IL_0008:  ret
```

These IL assembly language instructions correspond to the following source code segment of the .net program:

```
Int Add(int a,int b)
{
Return a+b;
}
```

In the embodiment, the selected binary code segment containing IL instructions is in a compiled executable file, and is a .net binary code segment generated by executing a program written in a development language supported for the .net platform on a computer. The executable file is a .exe file, which can be executed on a general-purpose computer, and on a .net virtual machine as well, if the computer has been configured with a .net virtual machine.

Optionally, a key binary code segment containing .net intermediate language instructions is selected from a compiled .net program to protect the .net program more effectively. The key binary code segment containing .net intermediate language instructions may be manually selected from a compiled .net program by a software developer, or be automatically selected by a computer according to a criteria.

Step 103. exchanging the instructions of the binary code segment in a computer memory, and removing the binary code segment from the .net program.

In the embodiment, the ADD instructions of the binary code segment are changed to the MUL instructions. For the purpose of description, the binary code segment generated from exchanging instructions is illustrated below, in the format of the IL assembly language:

```
locals init ([0] int32 CS$1$0000)
    IL_0000:   nop
    IL_0001:   ldarg.1
    IL_0002:   ldarg.2
    IL_0003:   mul
    IL_0004:   stloc.0
    IL_0005:   br.s        IL_0007
    IL_0007:   ldloc.0
    IL_0008:   ret
```

Step 104. writing the binary code segment to a shell of the .net program, and writing a shell calling instruction to an original location of the binary code segment in the .net program.

The shell calling instruction is adapted to call the shell. Upon executing the shell calling instruction, the execution will be directed to the shell.

Step 105. executing the .net program.

Step 106. going to the shell upon executing the shell calling instruction during execution of the .net program.

When the shell is loaded and executed, a .net virtual machine in the shell is automatically called.

Step 107. calling the .net virtual machine by the shell, and compiling the binary code segment into a native code instantly using a JIT compiler by the .net virtual machine according to a previous convention.

Step 108. executing the native code using a parsing instruction corresponding to the exchanging of instructions through the JIT compiler by the .net virtual machine; for example, translating the MUL instructions into the ADD instructions in the binary code segment with the JIT compiler.

Step 109. outputting a correct execution result of the binary code segment by the .net virtual machine.

Alternatively, at the step 101, it is possible to decompile the .net program to be protected to produce a text file of intermediate code, and then compile the text file of intermediate code to produce a .net binary code segment.

Embodiment 2

Figure 2:
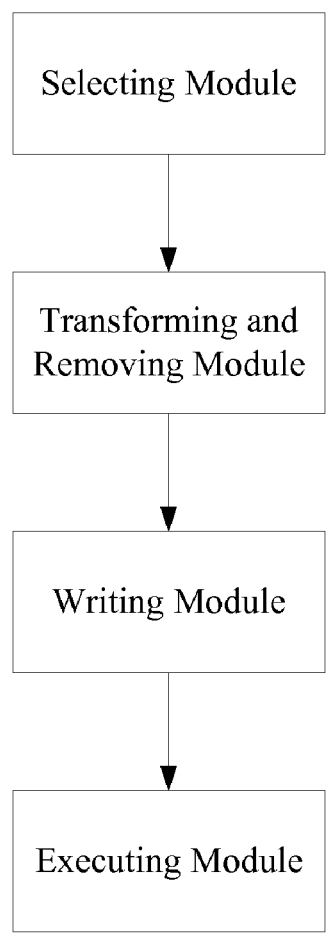
FIG. 2 is a block diagram of an apparatus for protecting .net programs of the present invention.

Referring to FIG. 2, the present invention also provides an apparatus for protecting .net programs. The apparatus includes:

a selecting module, adapted for selecting a binary code segment containing .net intermediate language instructions from a compiled .net program, and transmitting the binary code segment; optionally, a key binary code segment containing .net intermediate language instructions may be selected from a compiled .net program to protect the .net program more effectively; a key binary code segment containing .net intermediate language instructions may be manually selected from a compiled .net program by a software developer, or be automatically selected by a computer according to a criteria; the selected binary code segment containing .net intermediate language instructions is in a compiled executable file;

a transforming and removing module, adapted for receiving the binary code segment transmitted from the selecting module, transforming the binary code segment, removing the binary code segment from the .net program, and transmitting the transformed binary code segment;

a writing module, adapted for receiving the transformed binary code segment transmitted from the transforming and removing module, writing the binary code segment to a shell of the .net program, and writing a shell calling instruction to the .net program; the shell calling instruction will be written to an original location of the binary code segment in the .net program; the shell calling instruction, whose data portion varies depending on different requirements, is previously written, and an executing module, adapted for executing the transformed binary code segment upon executing the shell calling instruction of the .net program.

The executing module may include:

a .net virtual machine calling unit, adapted for calling a .net virtual machine upon executing the shell calling instruction of the .net program; and a virtual machine unit, adapted for executing the transformed binary code segment through a parsing instruction corresponding to the transformation according to a previous convention with the .net virtual machine.

Alternatively, the executing module may include:

a .net virtual machine calling unit, adapted for calling a .net virtual machine upon executing the shell calling instruction of the .net program;

a just-in-time compiling unit, adapted for compiling the transformed binary code segment into a native code instantly, and transmitting the native code, according to a previous convention with the .net virtual machine; and a virtual machine unit, adapted for receiving the native code transmitted from the just-in-time compiling unit, and executing the native code through a parsing code corresponding to the transformation, according to a previous convention with the .net virtual machine.

One of the key operations of the executing module is to call the .net virtual machine by the shell to execute the .net binary code segment written to the shell. Upon running the original location of the binary code segment, the execution of the .net program is directed to the shell through the shell calling instruction, and the .net virtual machine is called by the shell to execute the .net binary code segment written to the shell.

The present invention provides a solution to protect .net programs effectively by transforming the binary code segment of the .net program and then executing the binary code segment through a .net virtual machine, thus the .net programs can be protected unlimitedly. Any programs that can be executed on the .net platform can be protected simply by being transformed. Furthermore, the transformation can be processed in a predetermined way, and can be controlled by a fixed or changeable rule, because the virtual machine can be developed by software developers themselves. Even if the code is decompiled, the result would be disordered. The protection strength for software is therefore improved. In addition, people who have obtained the transformed source code with malicious intent cannot have the code executed properly, without awareness of the rule of transformation. Therefore, it is more difficult to crack the source code.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for protecting .net programs, wherein the method comprises the steps of:
   A. selecting a binary code segment containing .net intermediate language instructions from a compiled .net program;
   B. transforming the binary code segment, and removing the binary code segment from the .net program;
   C. writing the transformed binary code segment to a shell of the .net program, and writing a shell calling instruction to the .net program; and
   D. executing the .net program, calling a .net virtual machine by the shell calling instruction upon executing the shell calling instruction, and executing the transformed binary code segment by the .net virtual machine;
   wherein the step D comprises the substeps of:
      D1. executing the .net program, and calling the shell by the shell calling instruction upon executing the shell calling instruction;
      D2. calling a .net virtual machine by the shell;
      D3. executing the transformed binary code segment through a parsing instruction corresponding to the transforming by the .net virtual machine according to a previous convention; and
      D4. outputting a correct execution result by the .net virtual machine.

2. The method of claim 1, wherein the step A comprises: automatically or manually selecting the binary code segment according to its importance from the compiled .net program containing .net intermediate language instructions.

3. The method of claim 1, wherein the transforming the binary code segment at the step B comprises: logically transforming the binary code segment, and encrypting or compressing the binary code segment that has been logically transformed.

4. The method of claim 1, wherein the transforming the binary code segment at the step B comprises: logically transforming the binary code segment, or encrypting or compressing the binary code segment.

5. The method of claim 3, wherein the logically transforming the binary code segment comprises: exchanging instructions, disordering instructions, or recoding.

6. The method of claim 4, wherein the logically transforming the binary code segment comprises: exchanging instructions, disordering instructions, or recoding.

7. The method of claim 1, wherein the writing a shell calling instruction to the .net program at the step C comprises: writing a shell calling instruction to an original location of the binary code segment in the .net program.

8. The method of claim 1, wherein the substep D3 comprises:
   D3-1. compiling the binary code segment to a native code instantly by the .net virtual machine according to a previous convention; and
   D3-2. executing the native code through a parsing instruction corresponding to the transforming by the .net virtual machine.

9. The method of claim 1, wherein the transforming is based on a previous convention with the .net virtual machine in the shell of the .net program, and is directed to a source code on the basis of its original instruction format.

10. The method of claim 1, wherein the shell calling instruction is adapted to call the shell, and the .net virtual machine is automatically called upon the shell is loaded and executed.

11. An apparatus for protecting .net programs, wherein the apparatus comprises a processor to execute a selecting module, a transforming and removing module, a writing module and an executing module, wherein:
   the selecting module selects a binary code segment containing .net intermediate language instructions from a compiled .net program, and transmits the binary code segment;
   the transforming and removing module receives the binary code segment transmitted from the selecting module, transforms the binary code segment, removes the binary code segment from the .net program, and transmits the transformed binary code segment;
   the writing module receives the transformed binary code segment transmitted from the transforming and removing module, writes the binary code segment to a shell of the .net program, and writes a shell calling instruction to the .net program; and
   the executing module executes the transformed binary code segment upon executing the shell calling instruction of the .net program;
   wherein the executing module comprises a .net virtual machine calling unit and a virtual machine unit, wherein:
   the .net virtual machine calling unit calls a .net virtual machine upon executing the shell calling instruction of the .net program; and
   the virtual machine unit executes the transformed binary code segment through a parsing instruction corresponding to the transforming according to a previous convention with the .net virtual machine.

12. An apparatus for protecting .net programs, wherein the apparatus comprises a processor to execute a selecting module, a transforming and removing module, a writing module and an executing module, wherein:
   the selecting module selects a binary code segment containing .net intermediate language instructions from a compiled .net program, and transmits the binary code segment;
   the transforming and removing module receives the binary code segment transmitted from the selecting module, transforms the binary code segment, removes the binary code segment from the .net program, and transmits the transformed binary code segment;

the writing module receives the transformed binary code segment transmitted from the transforming and removing module, writes the binary code segment to a shell of the .net program, and writes a shell calling instruction to the .net program; and the executing module executes the transformed binary code segment upon executing the shell calling instruction of the .net program;

wherein the executing module comprises a .net virtual machine calling unit, a just-in-time compiling unit and a virtual machine unit, wherein:

the .net virtual machine calling unit calls a .net virtual machine upon executing the shell calling instruction of the .net program;

the just-in-time compiling unit compiles the transformed binary code segment to a native code in time, and transmits the native code, according to a previous convention with the .net virtual machine; and the virtual machine unit receives the native code transmitted from the just-in-time compiling unit, and executes the native code through a parsing code corresponding to the transforming, according to a previous convention with the .net virtual machine.

* * * * *